US005224731A

United States Patent [19]

Johnson

[11] Patent Number: 5,224,731

[45] Date of Patent: Jul. 6, 1993

[54] COMBINATION WHEEL CHAIR AND WALKER

[76] Inventor: Candace L. Johnson, 10466 Moselle St., San Diego, Calif. 92131

[21] Appl. No.: 941,908

[22] Filed: Sep. 8, 1992

[51] Int. Cl.[5] .............................................. B62M 1/14

[52] U.S. Cl. .................................. 280/648; 280/650; 280/87.021; 297/5; 297/DIG. 4

[58] Field of Search .......................... 297/5, 6, DIG. 4; 280/250.1, 304.1, 639, 647, 648, 650, 87.01, 87.021, 87.051, 47.4; 135/67

[56] References Cited

U.S. PATENT DOCUMENTS 2,733,754 2/1956 Leslie et al. ............................ 297/6
3.999,778 12/1976 Markiel ............................... 297/5 X
4,159,110 6/1979 Dodenhoff .......................... 297/5 X
4.307,715 12/1981 Fante ................................. 297/5 X
4,453.729 6/1984 Lucken .............................. 280/250.1
4,506,900 3/1985 Korosue ............................ 280/250.1
4,759,562 7/1988 Vinyard et al. ................. 280/304.1

*Primary Examiner*—Margaret A. Focarino
*Assistant Examiner*—Michael Mar
*Attorney, Agent, or Firm*—Frank D. Gilliam

[57] ABSTRACT

A wheel chair having four spaced apart surface support wheels positioned on each corner of a rectangular platform in which a person rides is readily convertible to a walker which supports a person walking therebehind which has a triangular support platform with two spaced apart wheels at the rear and two closely positioned wheels acting effectively as a single dual wheel at the front thereof. The front portion of the rectangular platform of the wheel chair folds together to form the walker triangular support platform. The seat platform of the wheel chair is flexible and folds up at the front when the device is in its walker configuration. A Velcro type strap closes the front of the folded seat at the fold to provide a closed container for carrying items.

6 Claims, 2 Drawing Sheets

COMBINATION WHEEL CHAIR AND WALKER

BACKGROUND OF THE INVENTION

This invention is directed to a device for conversion from a wheel chair to a walker for the disabled and more particularly for converting a conventional rectangular platform wheel chair into a triangular platform walker with a steerable front wheel pair acting as a single wheel.

Lillian L. Vingard et al. U.S. Pat. No. 4,759,562 issued Jul. 26, 1988 teaches a kit for converting a wheel chair into a walker. The kit includes loose parts that can be inadvertently lost or misplaced when the device is in one or the other configuration. A basic rectangular platform with corner wheels is used for both the wheel chair and walker configurations.

U.S. Pat. Nos. 4,506,900 and 4,453,729 teach generally conventional rectangular platform wheel chairs with a wheel on each corner of the rectangular.

U.S. Pat. Nos. 4,159,110 and 4,307,715 teach walker devices with a triangular base support with a wheel on each point of the triangle.

None of the prior art references teach a conversion from a conventional rectangular support wheel chair with a wheel at each corner of the rectangle to a conventional triangular support walker with a wheel or wheels at each of the three corners of the triangle until the emergence of the instant invention.

SUMMARY OF THE INVENTION

The invention is directed to a patient transport device which can be readily converted between a conventional four wheel rectangular support platform patient support wheel chair to a conventional three wheel triangular support platform patient walker.

The device of the instant invention in the wheel chair configuration has four spaced apart wheels, two in the normal front portion of the wheel chair which pivot relative to the wheel chair and two at the normal rear portion of the wheel chair which are fixed in position relative to a wheel chair forward direction. The pivotal front wheel attachments allows the wheel chair to be turned about the rear wheels in a conventional expected manner.

Frame upright members with handles for grasping by a person pushing the device in a wheel chair configuration or by a person using the device as a walker at the distal ends thereof and the fixed in position rear wheels at the lower or opposite ends thereof. An upper and lower frame member are fixedly attached between the two spaced apart handles. Extending toward the front of the device from the two spaced apart frame upright members and pivotable attached thereto are a pair of combination frame and patient arm support members. The pair of combination frame and patient arm support members extend downward at the front thereof and are pivotly attached at their front bottom surface to the forward wheels. Positioned between the two combination frame and patient arm support members is a frame cross member which is pivotly connected at each distal end to a combination frame and patient arm support member. The frame cross piece is formed of two halves. A centrally positioned interconnecting pivot connects the two halves together and allows the frame cross piece to fold upwardly or inwardly depending on the position of the pivot. When the two halves of the cross piece are pivoted the combination frame and patient arm support members pivot toward each other at the front which brings the two front most wheels together where they act as a single duel wheel. Thus the rectangular platform of the wheel chair configuration (with four spaced apart wheels on each corner thereof) forms a rectangular platform is easily converted to the triangular platform of the walker configuration with the two rear wheels spaced apart and the front two wheels centrally positioned together and acting as a single duel wheel.

The frame upright members are telescopic to provide height adjustment to the handles and to provide compactness when in a non-use configuration and conventional brakes on the rear wheels are provided that are operable from the handles.

When in the walker configuration the patient seat acts as a container for articles. A Velcro attached strap seals or closes the open forward end of the seat to prevent articles from falling from the normally open front of the folded seat.

An object of this invention is to provide a combined convertible wheel chair and walker which is simple to convert between either use by a person of limited physical strength.

Another object of this invention is to provide a combined convertible wheel chair and walker which has no or minimal removable parts to accomplish the conversion to either configuration.

Another object of this invention is to provide a combined convertible wheel chair and walker which when in a wheel chair configuration has a rectangular wheel supported base and when in the walker configuration has a steerable triangular wheel supported base with a pair of positioned together pivotal wheels in the front thereof.

Yet another object of this invention is to provide a container for holding articles when the device is in the walker configuration.

These and other objects and advantages of the present invention will become apparent to those skilled in the art after considering the following detailed specification in which the preferred embodiment is described in conjunction with the accompanying drawing Figure.

BRIEF DESCRIPTION OF THE DRAWINGS

FIG. is a front perspective of the wheel clair/walker of the present invention.

DESCRIPTION OF THE PREFERRED EMBODIMENT

Figure 1:
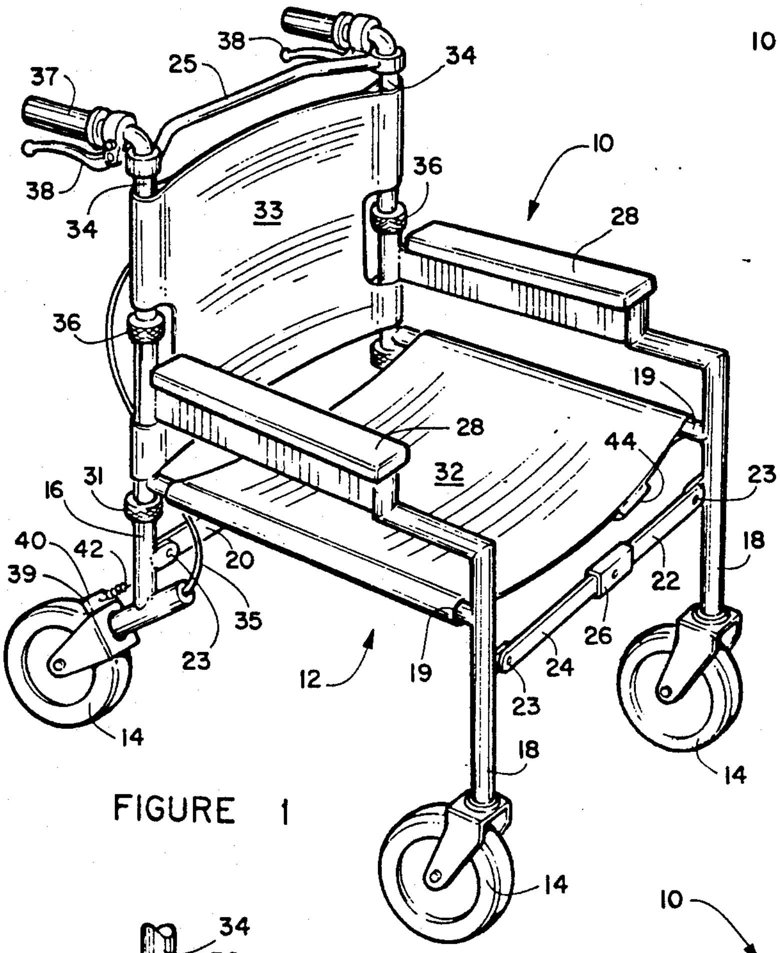
Figure 9:
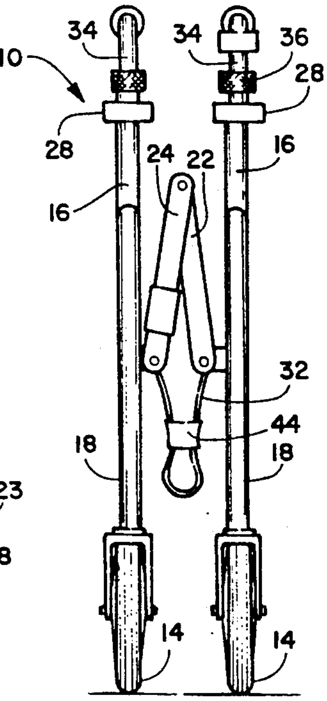
FIG. 9 shows the wheel chair/walker in a stowed or folded configuration.

Referring now to the drawing Figures, drawing FIG. 1 depicts a perspective showing of the combination wheel chair/walker device 10. In the wheel chair configuration as shown in drawing FIGS. 1, 2, 4, 7 and 8, a four wheel supported platform 12 which forms a rectangle support base with a wheel 14 at each corner thereof. The rear wheels are fixedly secured to uprights 16 and are fixed in a forward rotational direction. The front wheels are pivtoly secured to uprights 18 to allow for their independent relative directional rotation. A bar 20 comprised of two elements 22 and 24 which are pivotly attached at 23 to the uprights 18 at one end and pivotly attached to each other at there other end. An optional crosspiece 25 may be removably attached to the upper end of uprights 16 adjacent to the handles as required for device horizontal stability directed by the users weight. The cross piece 25 can be either removed by removing the handles and lifting upwardly or can be circumferentially latched at one or both ends for partial or complete removal. The crosspiece 25 must be removed from the upright 16 on at least one end to place the wheel chair/walker in the FIG. 9 stowed configuration. The cross piece 25 can also take the same configuration as cross piece 22 and fold rather than be at least partially disconnected from the uprights. Once the cross pieces 22, 24 are positioned as shown in FIG. 1, they are locked at their pivotal connection to each other to prevent inadvertently folding together as shown in drawing FIG. 9 by a slide lock clip 26 slidingly carried by one of the cross pieces 22, 24. The lock clip is slidable over the inner distal ends of the cross pieces to hold them along a straight horizontal plane and can be slid away from the distal end of one of the cross pieces for folding of the arms 22, 24, as shown in drawing FIG. 9. The two cross pieces 22, 24 are shown foldable toward each other in an upward manner. It should be understood that the two cross pieces can be made to fold in any suitable direction to practice the invention.

Figure 3:
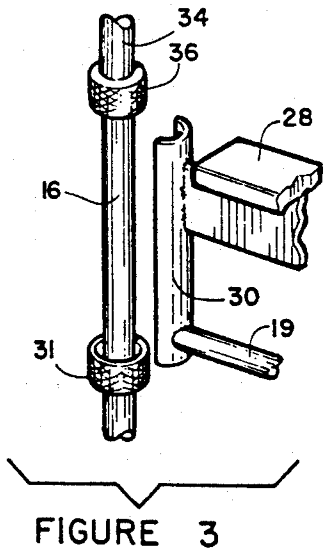
FIG. 3 is a section of the wheel chair/walker upright support and patient handle attachment thereto.
Figure 2:
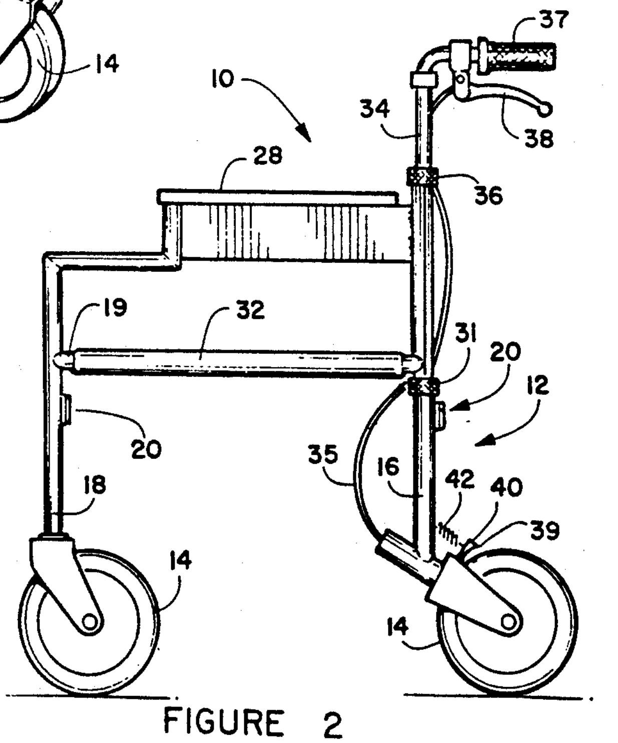
FIG. 2 is a side view of the wheel chair/walker of the invention.
Figure 4:
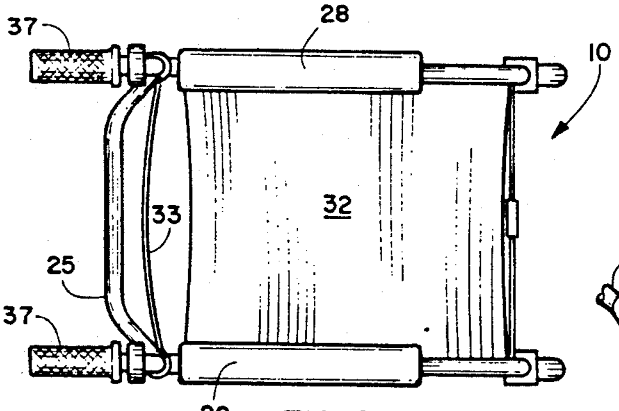
FIG. 4 is a top plan showing depicting the wheel chair/walker of FIG. 1 in a wheel chair configuration.

The uprights 18 form patient arm rests 28 for the wheel chair and support bars 19. The arm rests and bars are pivotly connected to the uprights 16 through support members 30, see drawing FIGS. 1 and 3. Support members 30 are held between fixed lock nut bushing and adjustable lock nut bushing 36 and are rotatable relative to the attached uprights 16.

A seat 32 for the wheel chair extends between the opposed support members 30 and bars 19.

A back support 33 extends between the uprights 16. The seat and back support are constructed of a flexible material such as for example, plastic, leather, cloth or the like suitable for the purpose intended. The lower portion of the seat back is fixedly attached around each upright 16 and the upper portion of the seat back is removably attached around the extensions 34 by connector 17, see drawing FIG. 7. The attachment of the seat back allows for positioning with handle height adjustment, allows for ease of bar 25 removal and the folding of the device into its non-use configuration.

Extension 34 telescopes into upright 16 which allows for elevation adjustment of the handle 37 which telescope relative to extension 34. The lock nut bushing 36 when tightened locks the telescopic portions at a selected elevation and provides the upper bushing for support 30.

The handle 37 on each side of the convertible wheel chair/walker 10 includes a brake lever 38 which includes an actuation cable 35 which extends to the rear fixed in direction wheels for breaking the rotation thereof. The brakes work in a conventional manner by squeezing the lever 38 toward the handle 37 causing inner wire of cable 35 to pull the braking surface 39 of brake lever 40 against the outer wheel surface 41 wheel surface against the bias of spring 42 which normally biases the brake in an off position. When the brake lever is released the spring returns the brake its off position. The brakes can be maintained in a brake condition which is easily releasable as is well known in the hand brake art.

In operation, as a wheel chair, both of the cross pieces 20 have segments 22, 24 locked in the FIGS. 1, 2, 4, 7 and 8 inline positions as are the uprights 18 and the support members 30.

Figure 5:
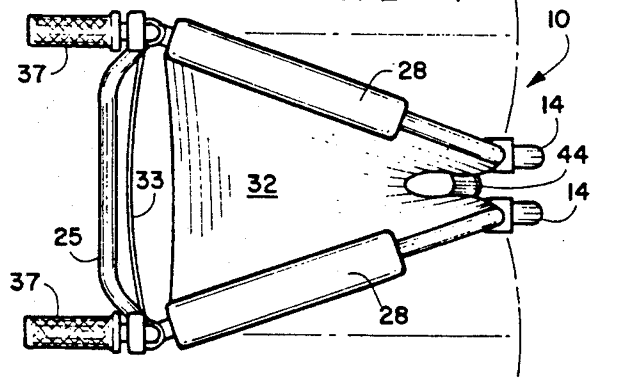
FIG. 5 is a top plan showing depicting the wheel chair/walker of FIG. 1 in a walker configuration.
Figure 6:
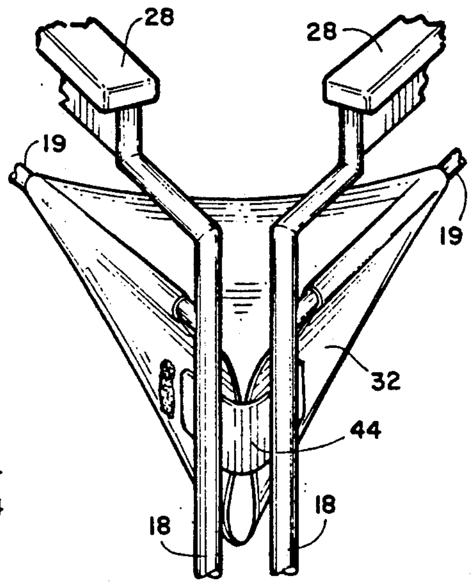
FIG. 6 is a front view of a portion of the wheel chair/walker in a walker configuration.
Figure 7:
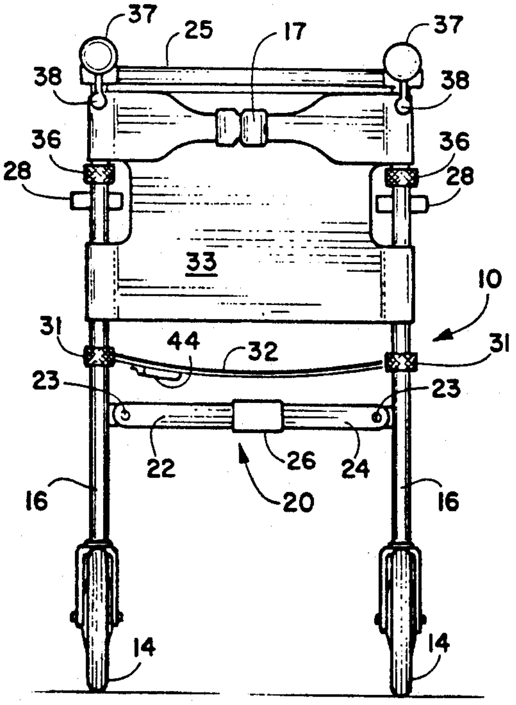
FIG. 7 is a showing of the rear of the wheel chair/walker in the wheel chair configuration.
Figure 8:
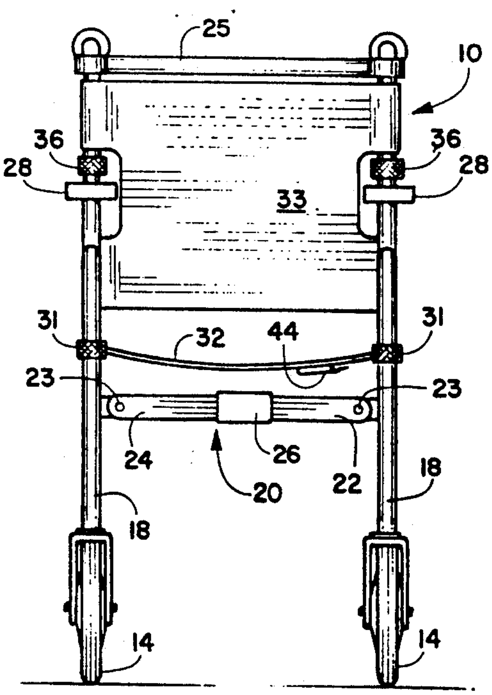
FIG. 8 is a showing of the front of the wheel chair/walker in the wheel chair configuration.

In operation as a walker, as shown in drawing FIGS. 5 and 6, the front cross piece 20's segments 22, 24 are folded toward each other causing the uprights 18 to come together at the front of the device placing the two front wheels 14 together and operable as a single dual wheel.

A Velcro fastener strap 44 is secured between the bottoms of the folded seat on each side thereof to seal off or close the gap formed by the folded seat to provide a item or article carrying pocket.

While specific embodiments of the convertible wheel chair/walker has been shown and fully explained above for the purpose of illustration it should be understood that many alterations, modifications and substitutions may be made to the instant invention disclosure without departing from the spirit and scope of the invention as defined by the appended claims.

What is claimed is:

1. A convertible wheel chair/walker device comprising: a pair of side members having a seat supported therebetween, a pair of upright members, means for connecting a rearward end of each side member to a respective one of said upright members while permitting rotational movement of said side member relative to said upright member, front releasable locking bar means interconnecting forwards ends of said side members, rear releasable locking bar means interconnecting said upright members, a pair of front wheels attached to forward ends of said side members, and a pair of rear wheels attached to lower ends of said upright members, wherein said device is convertible between a wheel chair mode in which said side members are locked in a laterally spaced parallel position by said front and rear locking bar means, a walker mode in which said front locking bar means is released and said side members have been pivoted to bring said front wheels into close proximity while said upright members are locked in said laterally spaced position to form a triangular configuration, and a collapsed mode in which said front and rear locking bar means are released to permit said side members to be in close proximity.

2. The invention as defined in claim 1 wherein the front wheels are independently directionally pivotable.

3. The invention as defined in claim 1 wherein each of the rear wheels are fixed in directional rotation.

4. The invention as defined in claim 1, further comprising means attachable to bottom portions of said seat when said device is in said walker mode.

5. The invention as defined in claim 1 further comprising braking means for braking the rotation of the rear wheels.

6. The invention as defined in claim 1 further comprising height adjustable handle means on each of said upright members.

* * * * *